April 3, 1934.  J. S. WALCH  1,953,663
HEADLIGHT BEAM DEFLECTOR
Original Filed Aug. 7, 1931
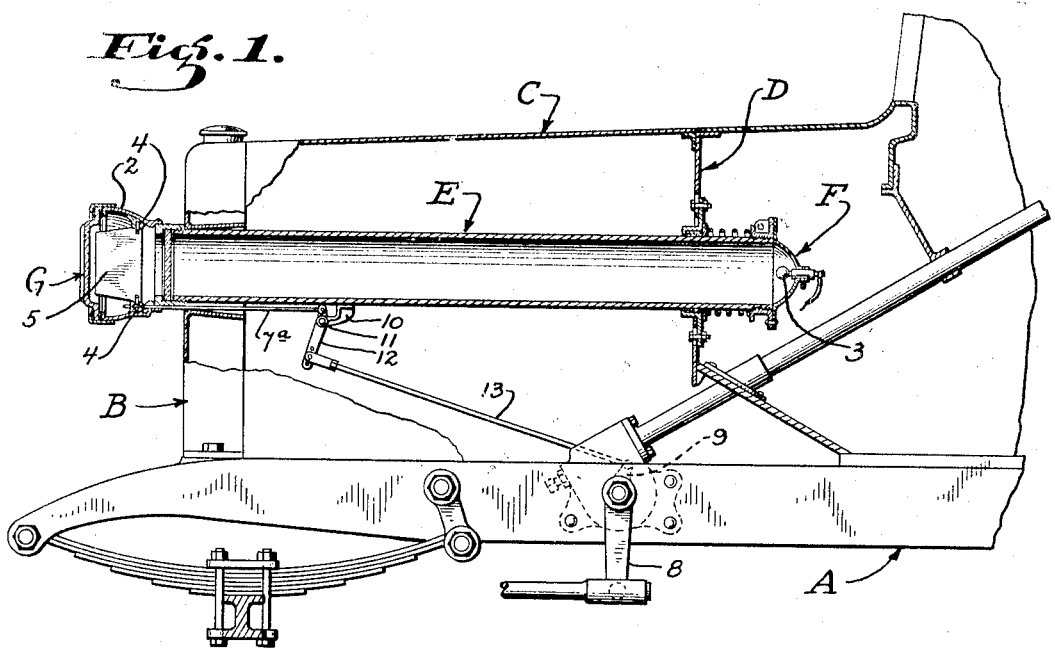
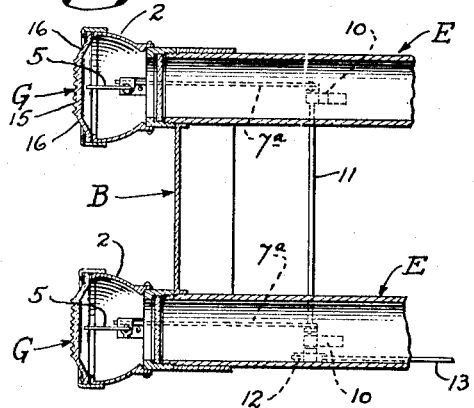
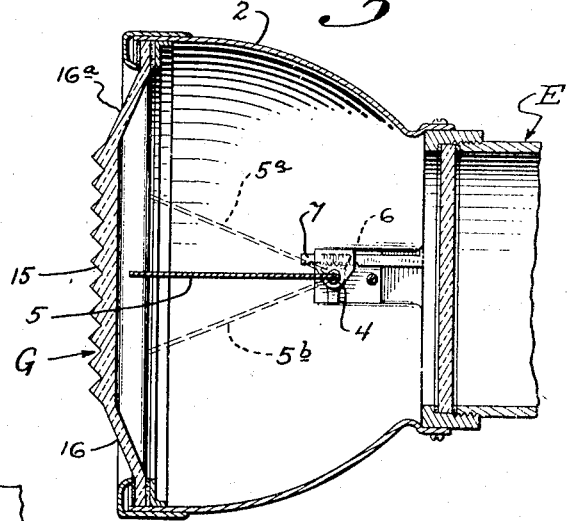
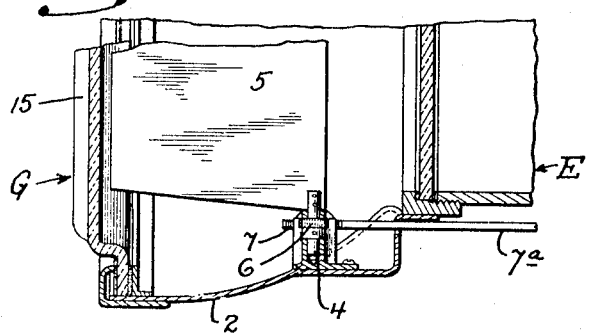
INVENTOR.
Jacob S. Walch.
BY Townsend, Loftus & Abbett
ATTORNEYS.

Patented Apr. 3, 1934

1,953,663

UNITED STATES PATENT OFFICE 1,953,663

HEADLIGHT BEAM DEFLECTOR

Jacob S. Walch, Stockton, Calif.

Application August 7, 1931, Serial No. 555,751
Renewed September 6, 1933

4 Claims. (Cl. 240—7.1)

This invention relates to headlights for motor vehicles and the like and especially to a deflector whereby a portion of the headlight beam is deflected to one side of the road or the other when rounding curves.

The object of the present invention is to generally improve and simplify the construction and operation of headlights; to provide a deflector whereby a portion of the headlight beam is deflected to one side or another of a road in rounding a curve; to provide means whereby the deflector is automatically actuated by the steering mechanism of the vehicle so as to direct the deflected portion of the beam to the proper side of the road; and, further, to provide a lens having a central portion whereby the main forward beam is modified and clear side portions through which the deflected beam is directed.

The invention is shown by way of illustration in the accompanying drawing, in which—

Fig. 1 is a partial side elevation in section of the automobile showing the application of the invention.

Fig. 2 is a plan view of two headlights showing the manner in which the deflectors are operated in using.

Fig. 3 is an enlarged horizontal section of the forward end of the headlight.

Fig. 4 is a partial vertical section of Fig. 3.

Referring to the drawing in detail and particularly Fig. 1, A indicates the main frame of an automobile, B the radiator, C the hood, and D the dashboard. Supported by the dashboard and the radiator is a long cylindrical shaped tube E. Mounted at the rear end thereof is a parabolic reflector F and mounted at the front end of the tube is an enlarged housing 2, which is closed by means of a lens generally indicated at G.

The headlight shown in the present application is fully described in applicant's co-pending application entitled "Headlight" filed January 7, 1931, Serial Number 507,160, hence anything but a brief description is thought unnecessary.

The tube E is highly polished on its inner surface to form a reflecting surface from end to end. The parabolic reflector F is similarly polished and it contains a lamp bulb or source of light 3. The parabolic reflector projects a beam of substantially parallel rays through the tube E and the lens G and a second beam is projected by the reflecting surface formed within the tube. That is, the direct rays of light from the bulb or lamp 3 impinge on the interior surface of the cylinder and as such are reflected thereby through the lens G as a second beam. A headlight of this character projects a comparatively intense concentrated beam and in actual practice it has been found that sufficient side light, for instance when rounding curves in a road, is not provided.

The purpose of the present invention is to provide means for deflecting a portion of the beam to one side or another of the road when rounding a curve. This is accomplished as follows: Pivotally mounted as at 4 within the enlarged housing 2 secured at the forward end of the reflecting tube E is a deflector 5. The deflector is highly polished on opposite sides and either side will thus function as a reflecting and deflecting surface. The lower pivot 4 is provided with a pinion 6 and this in turn meshes with a rack bar 7 so that when reciprocal movement is transmitted to the rack bar pivotal movement will be transmitted to swing the deflector to one side or another within the headlight housing 2. The mechanism for actuating the rack is connected with the steering mechanism of the automobile as shown in Figs. 1 and 2 and is accomplished as follows: Forming an extension of the steering crank indicated at 8 is a small crank arm 9. Secured to the lower portion of each tube E is a bearing bracket 10 and journaled in said bracke's and extending crosswise of the hood C is a shaft 11. A crank arm 12 is secured at each end of the shaft and one crank arm is connected through a link 13 with the crank 9. The rack bars 7 are extended to form links 7a and these are pivotally attached to the upper ends of crank arms 12, hence when the steering mechanism is operated movement is transmitted to swing the deflectors 5 about their pivots and in the proper direction.

The lens G placed in the forward end of the housing 2 is best illustrated in Figs. 3 and 4. It consists of a center portion 15 which is provided with a prismatic surface such as shown so as to cause modification and diffusion of the light beam when projected forwardly. Opposite sides of the lens are provided with angularly disposed portions 16 and these sections are clear and transparent so that when a portion of the light beam is deflected through one side or another of the lens undue bending or diffusion of the rays is avoided.

In actual operation when the automobile is travelling over a straight roadway the headlight beams will be projected through the prismatic surface 15 of the lens and as such will be subdued and modified as desired but when a curved portion of the road is reached movement is transmitted through the steering mechanism to swing the deflectors 5. For instance, if a curve turns to the right the deflectors 5 will swing in the same direction and will under certain conditions assume the dotted line position indicated at 5a, see Fig. 3. The parallel beams striking the surface of the reflector will thus be deflected through the side portion indicated at 16a and the inside of the road or curve will thus be properly illuminated, while the remaining portion of the beam will be projected forwardly through the center portion 15 of the lens thus insuring illumination both of the inside curve and the outer curve of the road. If the steering mechanism is rotated in the opposite direction the deflector will swing to assume the dotted line position indicated at 5b and a portion of the beam will then be projected through the clear side 16 of the lens and the opposite side of the road will be illuminated.

An important feature of the present invention is the mounting of the combination reflector and deflector within the lamp housing. This is exceedingly important as the deflector is maintained in a position where it is protected from dust and moisture. Furthermore, it can be made comparatively small and, again, the mechanism for actuating the same may be disposed within the lamp housing and the artistic effect and general appearance of the headlight is not destroyed; the remaining portion of the operating mechanism being enclosed by the hood C.

While the combination reflector and deflector is shown as attached to a headlight of special constructon it is obvous that it may be attached to practically any standard form of headlight as it is only necessary to interpose the combination reflector and deflector at a point between the parabolic reflector and the lens and, while certain features of the present invention are more or less specifically described, I wish it understood that various changes may be resorted to within the scope of the appended claims. Similarly, that the materials and finish of the several parts employed may be such as the manufacturer may decide, on varying conditions or uses may demand.

Having thus described my invention, what I claim and desire to secure by Letters Patent is—

1. In a headlight of the character described, a housing, a source of light in the housing, a reflector in one end of the housing and cooperating with the light to project a beam of substantially parallel rays, a lens in the opposite end of the housing through which the beam is projected, said lens having a center portion adapted to diffuse the light rays, a clear, transparent portion on each side of the diffusing portion, a second reflector pivotally mounted in the housing between the lens and the first named reflector, and means for swinging the second named reflector about its pivot so as to deflect a portion of the light beam through one or another of the clear portions of the lens.

2. In a headlight of the character described, a housing, a source of light in the housing, a reflector in one end of the housing and cooperating with the light to project a beam of substantially parallel rays, a lens in the opposite end of the housing through which the beam is projected, said lens having a center portion adapted to diffuse the light rays, an angular bent portion on each side of the diffusing portion of the lens, a second reflector pivotally mounted in the housing between the lens and the first named reflector, and means for swinging the second named reflector about its pivot so as to deflect a portion of the headlight beam through one or another of the angularly bent portions of the lens.

3. The combination with a headlight adapted to project a beam forwardly and having means for deflecting a part of said beam to either side, of a lens having a light diffusing surface in the path of said forward beam, and smooth surfaces in the paths of said sidewardly directed beams.

4. The combination with a headlight adapted to project a beam forwardly and having means for deflecting a part of said beam to either side, of a lens having a light diffusing surface in the path of said forward beam, and smooth surfaces in the paths of said sidewardly directed beams, said diffusing surface being disposed in a plane at right angles to the direction of the forward beam, and said smooth surfaces being disposed in planes substantially at right angles to the direction of the sidewardly directed beams.

JACOB S. WALCH.